United States Patent [19]

Bryan et al.

[11] 3,854,491

[45] Dec. 17, 1974

[54] CONTROLLED OPENING, VARIABLE ORIFICE, EXPLOSIVELY ACTUATED VALVE

[75] Inventors: Paul J. Bryan, Hewitt Post Office; Ronald F. McConnell, Pompton Lakes, both of N.J.

[73] Assignee: E. I. du Pont de Nemours and Company, Wilmington, Del.

[22] Filed: Jan. 3, 1972

[21] Appl. No.: 214,839

[52] U.S. Cl. .................... 137/1, 102/37.7, 102/39, 137/68, 280/150 AB
[51] Int. Cl. ........................................... B60r 21/08
[58] Field of Search ............ 222/5, 85, 3; 137/68, 1; 220/47, 89 A; 280/150 AB; 102/37.7, 39

[56] References Cited
UNITED STATES PATENTS

| | | | |
|---|---|---|---|
| 2,128,212 | 8/1938 | Mullins | 222/5 X |
| 2,206,818 | 7/1940 | Mapes | 137/68 |
| 2,441,011 | 5/1948 | Dodelin | 222/5 |
| 3,469,733 | 9/1969 | Montgomery et al. | 220/89 A |
| 3,632,135 | 1/1972 | Chute et al. | 280/150 AB |
| 3,670,925 | 6/1972 | Moyant | 137/68 X |
| 3,713,667 | 1/1973 | Blanchard | 280/150 AB |
| 3,741,580 | 6/1973 | Vos | 280/150 AB |
| 3,746,214 | 7/1973 | Stephenson | 280/150 AB |

*Primary Examiner*—Martin P. Schwadron
*Assistant Examiner*—Richard Gerard

[57] ABSTRACT

A diaphragm that closes the opening of a valve to passage therethrough of a fluid under pressure is perforated by actuation in controlled sequence of two or more electroexplosive devices thereby opening the diaphragm in two or more stages for passage of fluid through said valve.

5 Claims, 5 Drawing Figures

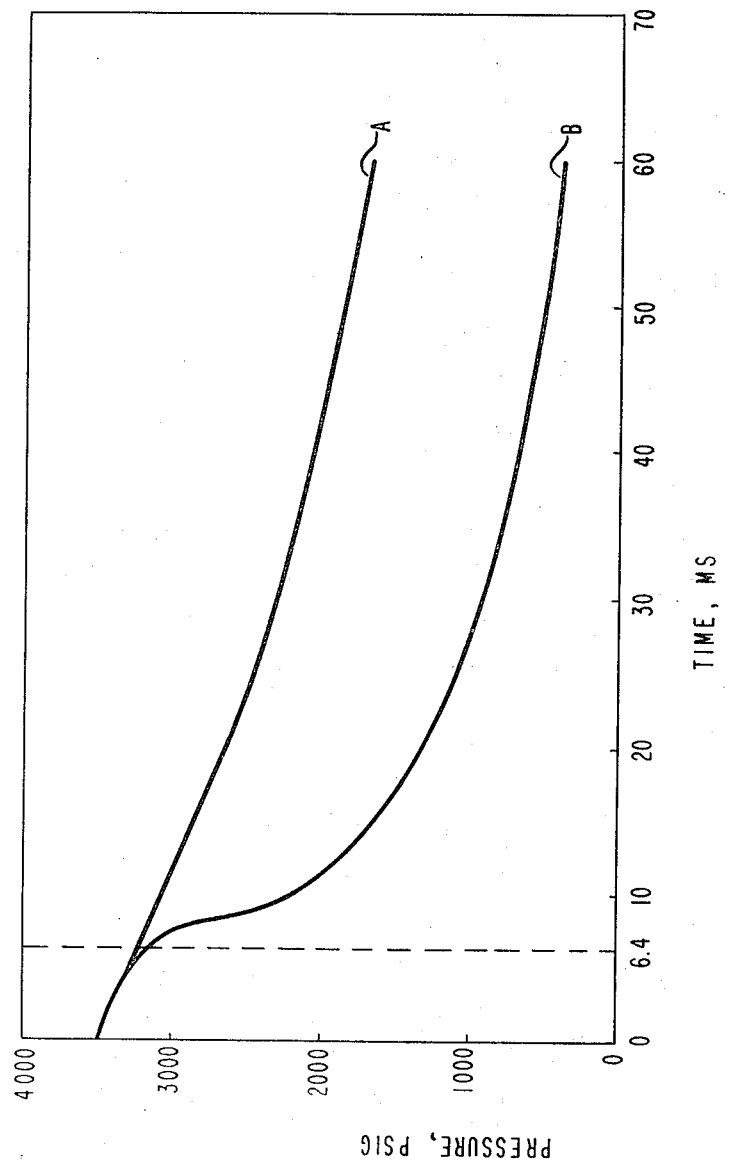

CONTROLLED OPENING, VARIABLE ORIFICE, EXPLOSIVELY ACTUATED VALVE

BACKGROUND OF THE INVENTION

1. Field of the Invention

This invention pertains to an explosively actuated, normally closed, valve that controls the passage therethrough of fluid under pressure. These valves are employed especially in the design and construction of passenger-restraint devices in vehicles such as automobiles, speedboats, trains and airplanes in conjunction with an inflatable confinement means or crash bag that is automatically inflated by a high pressure gas which is released by the valve upon a signal from an inertia-responsive mechanism, or other sensing means, upon sensing a rapid vehicle deceleration. The inflated gas bag is so placed that the passengers or other cargo in the vehicle are prevented from coming into abrupt contact with the structure of the vehicle.

2. Prior Art

U.S. Pat. No. 3,414,292 issued on Dec. 3, 1968 to S. Oldberg et al. discloses a device wherein an explosive ruptures a wall of a gas container along a linear notch or other stress riser. U.S. Pat. No. 3,469,733 issued on Sept. 30, 1969 to R. A. Montgomery et al. describes a rupture disc unit in which a U-shaped groove of graduated width is scored in the rupturable diaphragm. U.S. Pat. No. 3,539,200 issued on Nov. 10, 1970 to R. Chute discloses a safety device wherein a portion of a gas reservoir is weakened so that action of the explosive opens the wall of container, and internal gas pressure moves the wall outward. U.S. Pat. No. 3,567,245 issued to G. A. Ekstrom on Mar. 2, 1971 describes a surety arrangement wherein a retaining wall or disc is doubly grooved to insure rupture by either one of two relatively small electric blasting caps, either one of which can initiate rupture of the disc but no mention is made of a controlled time delay between functioning of the two caps such that a variable orifice effect is achieved.

To be effective, the fluid (usually a compressed gas) must fill the restraining bags with gas within a relatively short time, e.g., less than 100 milliseconds. If the gas-discharge orifice, such as that formed by a rupture disc closure, is opened fully and suddenly, the folded flexible restraining bag is unfolded and opened with considerable violence and noise, with the possibility of rupturing or tearing the bag and possibly injuring the individual against whom the bag expands. To overcome this difficulty, gas-diffusers are sometimes installed between the discharge orifice and the inflatable bag (e.g., see U.S. Pat. No. 3,414,292).

SUMMARY OF THE INVENTION

According to the present invention, the problem of controlling and moderating the discharge of gas from a high pressure vessel to a flexible, gas-inflatable, passenger-restraining, safety bag is solved by providing between the two containers a valve having a rupturable closure disc, preferably a suitably scored disc, that is perforated by two or more electrically actuated detonators that are fired in sequence with a delay interval between them of a few milliseconds, e.g., from 5 to 60 ms. Preferably, the first perforation is the smaller to facilitate easy initial expansion of the restraining bag, and successive openings of the diaphragm are larger so that total gas discharge and inflation of the restraining bag or bags is accomplished within the time required to provide maximum protection and safety for the passenger or passengers being immobilized by the restraining device. More particularly the present invention comprises an explosively actuated valve comprising a body having a passage therethrough which passage provides an inlet and an outlet for fluid under pressure, a fluid-impermeable diaphragm or rupture disc closing said passage to the movement of fluid, a plurality of electrically actutated, explosively operated, diaphragm-perforating devices that function in sequence; the initially activated device producing an initial opening in the diaphragm which is smaller than that of the final opening of the diaphragm and subsequent initiated devices producing successively enlarged opening of the diaphragm thereby permitting passage of fluid through the valve.

BRIEF DESCRIPTION OF DRAWINGS

FIG. 5 is a graph showing changes of gas pressure under two conditions of valve opening.

DESCRIPTION OF PREFERRED EMBODIMENTS

Figure 1:
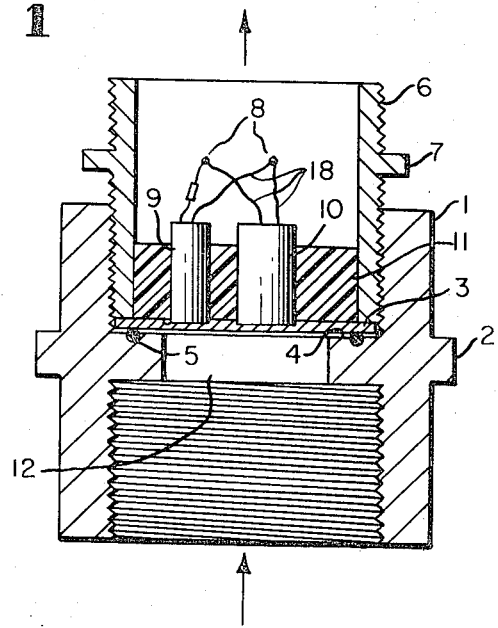
FIG. 1 is a cross-sectional elevation of one embodiment of a valve of the present invention taken along the line A—A of FIG. 2.
Figure 2:
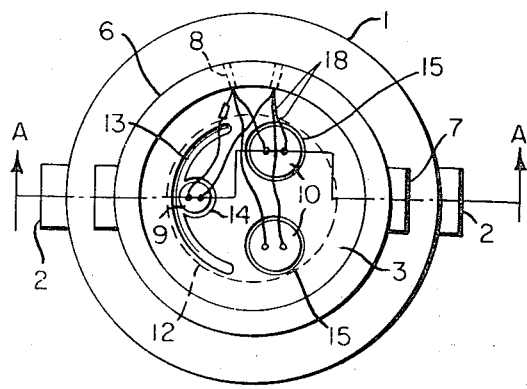
FIG. 2 is a plan view of the valve as inspected from above.

Referring now more particularly to the Figures, like numbers are used to indicate corresponding parts in all of the Figures. In FIG. 1, which is a cross-sectional elevation of one embodiment of the valve of this invention, 1 represents an internally threaded reversible coupling portion of the valve body including valve opening 12, wrench flats 2, and a grooved disc seat 4. An externally threaded nipple portion 6 of the valve body includes external wrench flats 7. Items 1 and 6 together compose the body of this particular valve. A closure diaphragm or disc 3 rests on an O-ring gasket 5 and is held firmly in place on disc seat 4 by seating nipple 6 on disc 3. Insulated, gas-tight electrical terminals 8 penetrate the wall of nipple 6. Electric blasting caps 9 and 10, preferably of different strengths, are held in place by a potting composition 11, e.g., an epoxy resin, and are connected by current-conducting wires 18 to terminals 8. The direction of passage of fluid through valve 1, when opened, is indicated by the arrows. In FIG. 2, the position of electric blasting caps 9 and 10 in depressions 14 and 15 (FIG. 3) is indicated, and location of milled groove 13 in diaphragm 3 adjacent to circular depression 14 also is shown. The relative location of these depressions is shown in FIG. 2.

Figure 4:
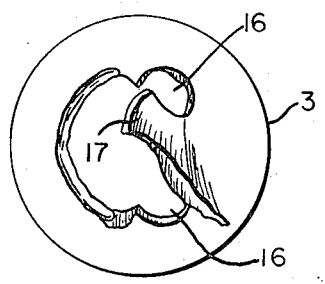
FIG. 4 is a plan view of a perforated closure diaphragm after opening of the valve.

In use of the valve, a cylinder capable of holding gas under high pressure is attached to the lower threaded portion of the assembled valve body, and a pipe or flexible tube connecting the valve of the invention to an expensible gas bag (not shown) is attached to the upper (nipple) portion of the assembled valve, which includes disc 3 and potted blasting caps 9 and 10 that are connected to electric terminals 8. The gas cylinder (not shown) can be charged with gas through a separate one-way filling valve after assembly of the gas cylinder with the valve. In one embodiment of the invention, 9 is a delayed firing electric blasting cap designed to explode within a few milliseconds after application of the firing current, whereas electric blasting caps 10 fire almost immediately after application of the firing current. A sensing device of known design, not a part of this invention, that is activated by an impending impact, closes the electrical circuit that furnishes current to terminals 8. Caps 10 fire first, perforate the disc at depressions 15, producing circular openings 16. This action partially opens the diaphragm of the valve and permits gas to flow through the valve and into the inflatable, passenger-restraining gas bag. After a few milliseconds, cap 9 detonates, thereupon puncturing diaphragm 3 at depression 14 and starting a tear in milled groove 13, said tear being continued by pressure of the contained gas. The combined perforation and tearing of the diaphragm 3 produce a metallic tongue 17 that is crumpled and folded back as indicated in FIG. 4. This second stage action greatly enlarges the opening in the diaphragm and permits more rapid release of gas through valve opening 12 so that the partially distended crash bag becomes fully inflated within the period of time required to provide the desired passenger-protective action.

Example

Figure 3:
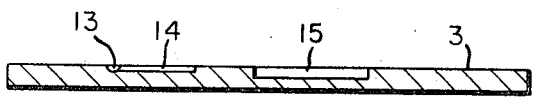
FIG. 3 is an enlarged cross-sectional view of the closure diaphragm of FIG. 2 along line A—A.

A diaphragm having a diameter of 1.8 inches and a thickness of 0.075 inches was fabricated from annealed type 304 stainless steel. With reference to FIGS. 3 and 4, depressions 15 had a diameter of 0.388 inches and were milled to a depth of about 0.055 inches. Depression 14 had a diameter of 0.283 inches and was milled to a depth of about 0.015 inches. Groove 13 located as shown had a cross section representing the segment of a circle made by a ball-shaped end mill having a diameter of 0.125 inches. The groove 13 was milled to a maximum depth of about 0.045 inches. The end of an electric blasting cap having a diameter of about 0.285 inches and a length of about 1⅛ inches and charged with 3.0 grains of lead azide base load and a standard ignition mixture and wire, was placed in each depression 15 as shown. An electric blasting cap having a diameter of about 0.285 inches and a length of 1 5/16 inches and charged with 6.9 grains of pentaerythritol tetranitrate base load along with 3.0 grains of lead azide primer and a standard ignition mixture and wire, was fitted in depression 14 as shown and all three caps were secured in place using a standard type of epoxy resin as the potting compound. Suitable protective devices were provided to insure that the first detonation of the initial caps did not detonate the second cap nor cause a tear in the semicircular groove. A resistance of 6.6 ohms was placed in series with the electrical circuit to cap 9 to provide the delay in firing. Current to fire the caps was obtained from a 19-volt constant voltage source. The valve assembly was attached to an air cyclinder having a volume of about 160 cubic inches and the cylinder was charged with air to a pressure of 3500 psig. The caps were detonated and the gas pressure decay in the cylinder noted. The delay in firing cap 9 was 6.4 milliseconds. The above procedure was repeated with only caps 10 being detonated. The results are shown in FIG. 5.

The decay of pressure in the gas cylinder, originally charged at 3500 psig, when only the caps 10 were detonated is represented by curve A, and the stepwise, more rapid decay of pressure in the gas cylinder after all caps were exploded in the indicated sequence is shown in curve B. The accelerated release of gas pressure because of the detonation of cap 9, 6.4 ms after caps 10 with a resultant increase in area of the exit opening, is apparent. The pressure of gas in this particular cylinder was reduced, e.g., to about 800 psig after 60 milliseconds, vs about 1700 lbs. when the gas was vented through openings 16 alone. The rate of discharge of gas is adjustable by making changes in the size of openings in the diaphragm and the sequence in which they are created.

It will be apparent that the body of the variable orifice valve can be made of any suitable metal having adequate strength for the service in which it is used. The design of the body of the valve may be varied from that shown in FIGS. 1 to 3, the only requirement being provision of a diaphragm closure that can be perforated by electroexplosive devices operating in timed sequence to provide a successively larger opening in the diaphragm closure of the valve. The diaphragm can be made of any suitable material having sufficient ductility to be perforated, rather than being disintegrated, by action of the electroexplosive valve-opening means. Noncorroding low cost metal diaphragms generally are preferred as these will retain their physical properties during long periods of storage under pressure.

The selection of size and explosive load in the explosive devices is within the skill of the art in view of this disclosure. If the potting composition does not provide sufficient protection of the electric blasting caps or other electroexplosive device against the damaging effects of the device first to explode, additional protection for the remaining caps can be provided by metal sleeves or metal partitions that are inserted around the later firing caps before adding potting compound to the disc-rupturing assembly.

Although the invention as exemplified herein employs one or more delay-type electroexplosive devices, more specifically delayed firing electric blasting caps, to provide staged opening of the valve closure, any other effective mechanical means or electronic logic circuit that will provide the desired controlled delay can be employed to achieve similar results.

As exemplified herein, the variable orifice valve of this invention is reusable. The valve body is removed after release of gas pressure from the cylinder, the two parts of the valve body are separated, a new gasket and disc are inserted, and the valve is reassembled for use. Valve bodies of other designs can be used provided that a suitable diaphragm is employed as the closure means for a valve of this invention.

A variable orifice valve of the invention also can be employed for staged release of liquids under pressure, and such use is not precluded by the exemplification made herein.

We claim:

1. A valve comprising a body having a passage therethrough which passage provides an inlet and an outlet for fulid under pressure, a fluid-impermeable diaphragm closing said passage to the movement of said fluid, a plurality of electrically actuated and explosively operated devices adapted to perforate said diaphragm, means to sequentially activate said devices thereby producing an initial opening of the diaphragm which is smaller than that of the final opening in said diaphragm followed by an enlarged opening to obtain final opening of said diaphragm.

2. the valve of claim 1 wherein said diaphragm has relatively thin sections which define a pattern for rupture of the diaphragm and wherein said devices are arranged to perforate said diaphragm adjacent at least a portion of said relatively thin cross section.

3. The valve of claim 2 wherein said devices are electrically actuated blasting caps.

4. The valve of claim 1 wherein said devices are electrically actuated blasting caps.

5. A method for opening a passageway for fluid which passageway is normally closed by a fluid impermeable diaphragm comprising perforating said diaphragm by sequentially actuating electroexplosive diaphragm-perforating means such that there is produced an initial opening of the diaphragm which is smaller than that of the final opening in said diaphragm followed by an enlarged opening to obtain final opening of said diaphragm.

* * * * *